US007698727B2

(12) United States Patent
Kikinis et al.

(10) Patent No.: US 7,698,727 B2
(45) Date of Patent: Apr. 13, 2010

(54) METHOD AND APPARATUS FOR NOTIFYING USERS OF INTERACTIVE FUNCTIONS USING A REMOTE DEVICE

(75) Inventors: Dan Kikinis, Saratoga, CA (US); Yakov Kamen, Cupertino, CA (US)

(73) Assignee: JLB Ventures LLC, Washington, DC (US)

( * ) Notice: Subject to any disclaimer, the term of this patent is extended or adjusted under 35 U.S.C. 154(b) by 1373 days.

(21) Appl. No.: 09/875,707

(22) Filed: Jun. 5, 2001

(65) Prior Publication Data

US 2002/0059597 A1 May 16, 2002

(51) Int. Cl.
*H04N 7/16* (2006.01)
*G06F 3/00* (2006.01)
*G06F 13/00* (2006.01)
*H04N 5/445* (2006.01)

(52) U.S. Cl. .............................. 725/141; 725/39; 725/61
(58) Field of Classification Search .................... 725/51
See application file for complete search history.

(56) References Cited

U.S. PATENT DOCUMENTS

| 4,621,259 | A | | 11/1986 | Schepers et al. |
| 5,243,418 | A | | 9/1993 | Kuno et al. |
| 5,410,326 | A | * | 4/1995 | Goldstein ................... 348/734 |
| 5,414,773 | A | | 5/1995 | Handelman |
| 5,477,262 | A | * | 12/1995 | Banker et al. ................. 725/38 |
| 5,479,268 | A | | 12/1995 | Young et al. |
| 5,485,197 | A | | 1/1996 | Hoarty |
| 5,519,433 | A | * | 5/1996 | Lappington et al. ......... 725/110 |
| 5,532,754 | A | | 7/1996 | Young et al. |
| 5,550,576 | A | | 8/1996 | Klosterman |
| 5,679,943 | A | * | 10/1997 | Schultz et al. ......... 235/472.02 |
| 5,683,113 | A | * | 11/1997 | Petrucci ....................... 283/36 |
| 5,684,525 | A | | 11/1997 | Klosterman |
| 5,704,837 | A | | 1/1998 | Iwasaki et al. |
| 5,710,605 | A | * | 1/1998 | Nelson ....................... 348/734 |
| 5,724,492 | A | | 3/1998 | Matthews, III et al. |
| 5,737,028 | A | | 4/1998 | Bertram et al. |
| 5,751,282 | A | | 5/1998 | Girard et al. |
| 5,808,613 | A | | 9/1998 | Marrin et al. |
| 5,818,441 | A | | 10/1998 | Throckmorton et al. |
| 5,828,945 | A | | 10/1998 | Klosterman |
| 5,831,664 | A | * | 11/1998 | Wharton et al. ............... 725/81 |
| 5,841,563 | A | | 11/1998 | Effenberger |
| 5,900,915 | A | | 5/1999 | Morrison |
| 5,923,362 | A | | 7/1999 | Klosterman |
| 5,926,168 | A | | 7/1999 | Fan |
| 5,929,849 | A | | 7/1999 | Kikinis |
| 5,940,073 | A | * | 8/1999 | Klosterman et al. ......... 715/721 |

(Continued)

FOREIGN PATENT DOCUMENTS

JP 410093880 A 4/1998

(Continued)

*Primary Examiner*—Dominic D Saltarelli
(74) *Attorney, Agent, or Firm*—Banner & Witcoff, Ltd.

(57) ABSTRACT

A method and apparatus for notifying a user of an interactive event using a remote control device. In one embodiment, a remote control device contains either a display or a bright light, or both, which can create a visual alert to let a user know that an interactive function is available. The nature of the function may be displayed on a screen attached to the remote control device.

25 Claims, 4 Drawing Sheets

U.S. PATENT DOCUMENTS

| | | | |
|---|---|---|---|
| 5,956,025 A * | 9/1999 | Goulden et al. | 715/716 |
| 5,956,456 A | 9/1999 | Bang et al. | |
| 5,977,964 A | 11/1999 | Williams et al. | |
| 5,991,799 A * | 11/1999 | Yen et al. | 709/218 |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,029,195 A | 2/2000 | Herz | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,097,441 A * | 8/2000 | Allport | 348/552 |
| 6,104,334 A * | 8/2000 | Allport | 341/175 |
| 6,130,726 A * | 10/2000 | Darbee et al. | 348/734 |
| 6,167,188 A | 12/2000 | Young et al. | |
| 6,172,677 B1 * | 1/2001 | Stautner et al. | 715/716 |
| 6,181,326 B1 * | 1/2001 | Takahashi | 345/158 |
| 6,205,485 B1 | 3/2001 | Kikinis | |
| 6,209,132 B1 * | 3/2001 | Harrison et al. | 725/141 |
| 6,233,389 B1 | 5/2001 | Barton et al. | |
| 6,243,039 B1 | 6/2001 | Elliot | |
| 6,246,441 B1 * | 6/2001 | Terakado et al. | 348/552 |
| 6,271,831 B1 | 8/2001 | Escobosa et al. | |
| 6,311,329 B1 * | 10/2001 | Terakado et al. | 725/44 |
| 6,313,887 B1 * | 11/2001 | Gudorf | 348/734 |
| 6,349,410 B1 * | 2/2002 | Lortz | 725/110 |
| 6,401,059 B1 * | 6/2002 | Shen et al. | 703/27 |
| 6,640,113 B1 * | 10/2003 | Shim et al. | 455/566 |
| 2001/0021998 A1 * | 9/2001 | Margulis | 725/81 |
| 2005/0028208 A1 * | 2/2005 | Ellis et al. | 725/58 |

FOREIGN PATENT DOCUMENTS

| | | | |
|---|---|---|---|
| WO | WO 00/01149 A1 | 1/2000 | |

* cited by examiner

US 7,698,727 B2

METHOD AND APPARATUS FOR NOTIFYING USERS OF INTERACTIVE FUNCTIONS USING A REMOTE DEVICE

FIELD OF THE INVENTION

The invention related to the field of interactive programming. More specifically, the invention relates to providing a better interface for interactive programs.

BACKGROUND OF THE INVENTION

An Electronic Programming Guide (EPG) displays information about programs a viewer is currently watching as well as information about other programs on different channels or at different times. The first EPGs were typically displayed on one channel of a cable television system. These early EPGs were simple, displaying short program descriptions and scrolling past the screen at a predetermined rate. Also, these EPGs typically did not allow for user interaction. More recent digital EPGs allow for the user to interact with the programming schedule, and to view programs while scanning the guide. However, digital EPGs still typically rely on the television as a means of showing the EPG.

Currently, EPGs are displayed only on the primary video display, typically a television, itself. This is because a television is usually the most expensive component in a home entertainment system, and further because until recently a television was the only display device in many homes. As a result, the television is used to show both the programs themselves as well as the EPG.

Typically, an EPG will be displayed in one of two ways. It will either be displayed using the full television screen, completely preempting the programming selection, or the EPG may occupy only a portion of the screen as an overlay, the rest of the screen used to display the current program. Where an EPG only occupies a portion of the screen, however, it may be difficult to read because of the small size of the text, or may not provide much information about the current selection or other programs. Additionally, the main program is interrupted by the overlay.

This method of displaying programming information can have several other disadvantages as well. When there are several viewers, if one decides to view the EPG, all other viewers must wait until the one using the EPG is finished. This interruption may be quite inconvenient for the other viewers.

Current interactive television systems, such as Wink™, WebTV™, or MSTV™ create interactive applications that a television viewer may use while they are watching television. Once the application becomes active, the interactive television system must alert the user that there is an interactive function available. Previous systems have either displayed a logo or a window on the television screen itself. This can be disruptive to all viewers as it interrupts the programming.

What is needed is a way to alert a user to the availability of interactive television without disrupting other viewers by displaying the alert on the screen itself.

SUMMARY OF THE INVENTION

The present invention provides a method and apparatus for an interactive television system that provides interactive functions, and alerts a user of those interactive functions. In one embodiment, a remote control device contains either a display or a bright light, or both, which can create a visual alert to let a user know that an interactive function is available. The nature of the function may be displayed on a screen attached to the remote control device.

BRIEF DESCRIPTION OF THE DRAWINGS

The present invention is illustrated by way of example and not limitation in the figures of the accompanying drawings, in which.

DETAILED DESCRIPTION

Applicant claims priority to provisional application Ser. No. 60/218022, filed Jul. 12, 2000, claims priority to provisional application Ser. No. 60/218015, filed Jul. 12, 2000, and claims priority to provisional application Ser. No. 60/215681, filed Jun. 30, 2000, which are incorporated herein by reference.

One embodiment provides a method and apparatus for alerting a user of an interactive function using a remote device. In the following description, for purposes of explanation, specific details are set forth to provide a thorough understanding of the present invention. However, it will be apparent to one skilled in the art that these specific details are not required in order to practice the present invention.

An EPG allows a user to perform a range of functions that may be useful when watching television. Commonly assigned U.S. patent application Ser. No. 09/488,361, filed Jan. 16, 2000, describes in more detail the functions of an EPG and is hereby incorporated by reference.

The main function of an EPG is to allow a user to view program listings sorted by channel and time. Newer EPGs allow a user to browse through the listings, and to get detailed information about specific programs. EPGs may also allow a user to select certain channels or programs in which the user is particularly interested. Additionally, an EPG may control a recording device, and start recording when programs selected by the user are shown.

The typical television viewer now has many devices that have display screens, such as PCs, PDAs, web phones, etc., in addition to their television. Current EPGs are displayed on the television screen itself. This can lead to problems when there is more than one viewer, because viewers other than the one operating the EPG may not wish to view the EPG. Problems may also arise when the EPG attempts to display both the guide and a television program at the same time, because either the text may be too small or there may be too little information displayed. New display devices, such as PCs and PDAs give the user the opportunity to view the programming guide on an second screen, eliminating the problems associated with displaying an EPG and programs on the same screen.

Figure 1:
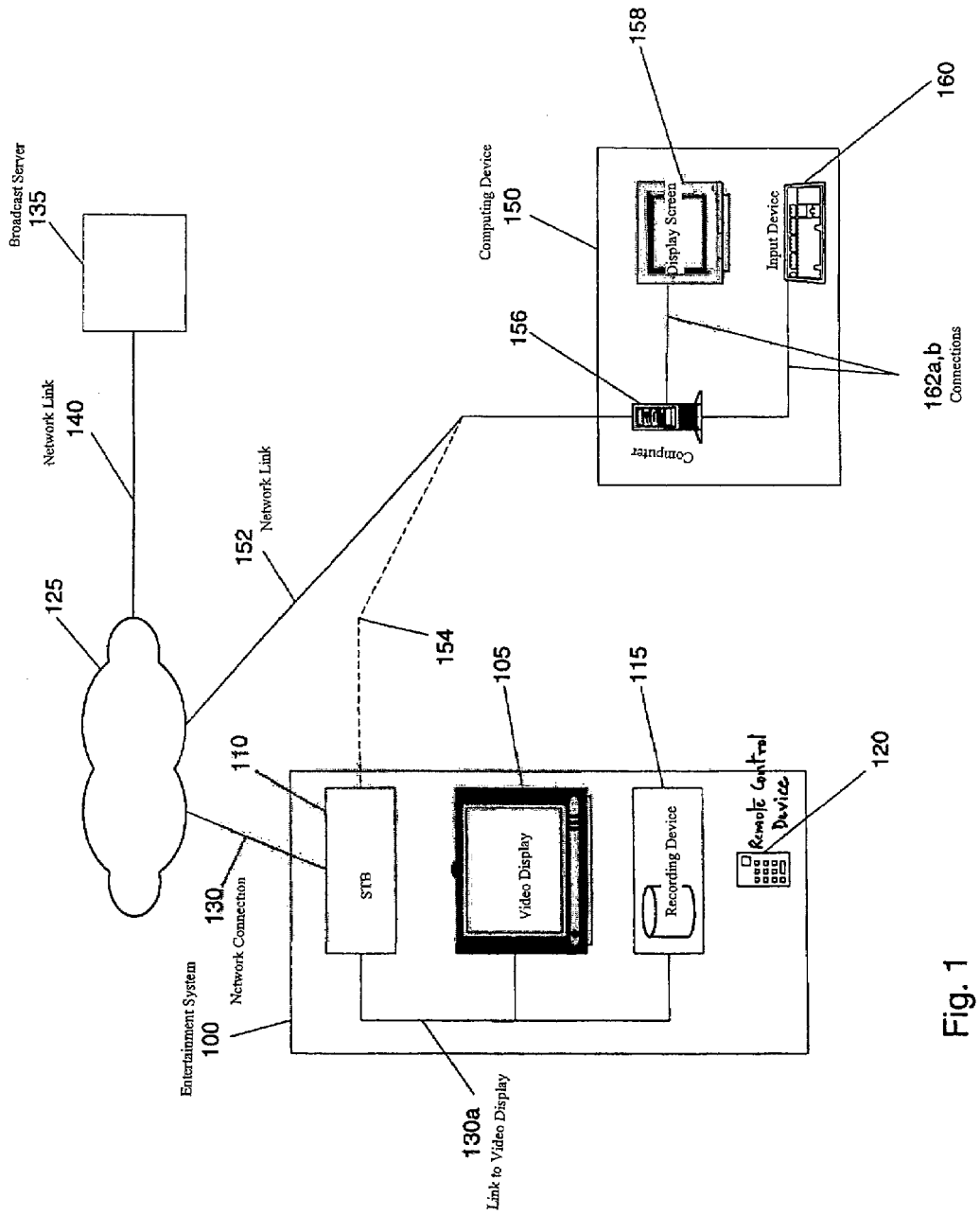
FIG. 1 illustrates an entertainment system with an electronic programming guide displayed on a remote computing device.

FIG. 1 illustrates an apparatus for displaying an EPG on a display other than the primary display according to one embodiment. Entertainment system 100 is an exemplary entertainment system which allows a user to watch television, record television programs, and perform various other functions.

As shown, entertainment system 100 includes a television or other video display 105, a set-top box (STB) 110, a digital or other recording device 115, and a remote control device 120.

Video display 105 can be a television, plasma screen, liquid crystal display (LCD) or any other device capable of interpreting and displaying signals sent by set top box 110 (STB). STB 110 is receives and descrambles cable television and other signals, allows for interaction with the viewer, and transmits the resulting signals to video display 105. Recording device 115 may be any one of or a combination of any one of a number of devices including video cassette recorders (VCRs), hard drives, digital versatile disc-random access memory (DVD-RAM) recorders, etc. Video display 105, STB 110 and recording device 115 may also be combined in any fashion.

Set top box (STB) 110 can receive signals from network 125 through network connection 130. It can also receive information from link 130a to video display 105 and recording device 115. Remote control device 120 is capable of controlling the functions of the various components of entertainment system 100 using infrared or other transmission means.

Network 125 may consist of a single network or a group of networks such as the Internet. Network connection 130 can deliver signals to STB 110 over a local area network (LAN), a wide area network (WAN), satellite broadcast, or other data transmission means. Network connection 130 can deliver analog, digital or HDTV signals, or any combination thereof. Network connection 130 may also allow unidirectional or bidirectional Internet access.

In one embodiment, network 125 would comprise a single high-bandwidth digital network that allows both digital video streams and Internet access as well as other services to run on the same network. In another embodiment, the network connection 130 would comprise fiber optic cable, although it is clear that any means of connecting the network may be employed.

Although only a single network cloud 125 is shown in FIG. 1, in other embodiments, any number of different types information providers and network connections may be utilized. For example, broadcast server 135 has programs which can be viewed using entertainment system 100. Broadcast server 135 delivers information to network 125 through network link 140, and eventually to STB 110.

Computing device 150 is coupled with network 125 through network link 152. Computing device 150 may also be coupled with set top box 110 via network link 154. Because set top box 110 has its own network connection 130, it is also possible to forgo network connection 152 and route network access for computing device 150 through set top box 110.

Computing device 150 comprises a computer 156, a display screen 158, an input device 160, and connections 162a and 162b. Computer 156 may be any device, such as a Personal Computer (PC), a Personal Digital Assistant (PDA), or a web phone, capable of processing commands necessary to display output on display screen 158. Display screen 158 may be a computer monitor or an LCD screen, or any other device capable of displaying the output of computer 156.

Input device 160 may be a keyboard, mouse, joystick, writing tablet, or any other means of inputting data into computer 156. The components of computer 156 communicate with each other through connections 162a and 162b, although any number of additional connections may be added for additional peripherals and for additional connections between the already enumerated components.

As shown in FIG. 1, computing device 150 is simplified for purposes of explanation. Any number of additional components may be added to computing device 150 beyond those necessary for use with the invention.

As shown in FIG. 1, it is possible for several people to watch programming on video display 105 while one or more other persons uses computing device 150 to view an EPG on display screen 158. As a result, the programming displayed on video display 105 is undisturbed, and those perusing an EPG using computing device 150 can do so at their leisure. Also, because the EPG is shown on computing device 150, it is more easily customized and can be seen more clearly.

Input device 160 can be used to select programs to be watched on video display 105, or to otherwise browse through the EPG. In addition, a cable television provider sending programming to set top box 110 may have preset selections to send to computing device 150. A user may also use input device 160 to make viewing selections, preprogram reminders for viewing selections, program recording events, or perform any other function typical of Electronic Programming Guides (EPGs).

Recording device 115 can also be configured through the EPG to start recording slightly before a program is scheduled to begin and to end recording slightly after a program is scheduled to end in order to compensate for scheduling inaccuracies. A server, such as broadcast server 135 may also control these functions.

STB 110 may also provide for interactive functions such as online shopping, contests, games, chat, etc. Either input device 160 or remote control device 120 can be used to create input for the interactive functions of STB 110.

A user of the EPG displayed on computing device 105 may also, through input device 160, display portions of or the entire EPG on video display 105. This way, it is possible that a user may share programming information with all viewers, and thus the invention retains all of the benefits of previous EPGs displayed on a television. This also allows those who have poor vision, or are otherwise unable to use display screen 158, to use the EPG.

Figure 2:
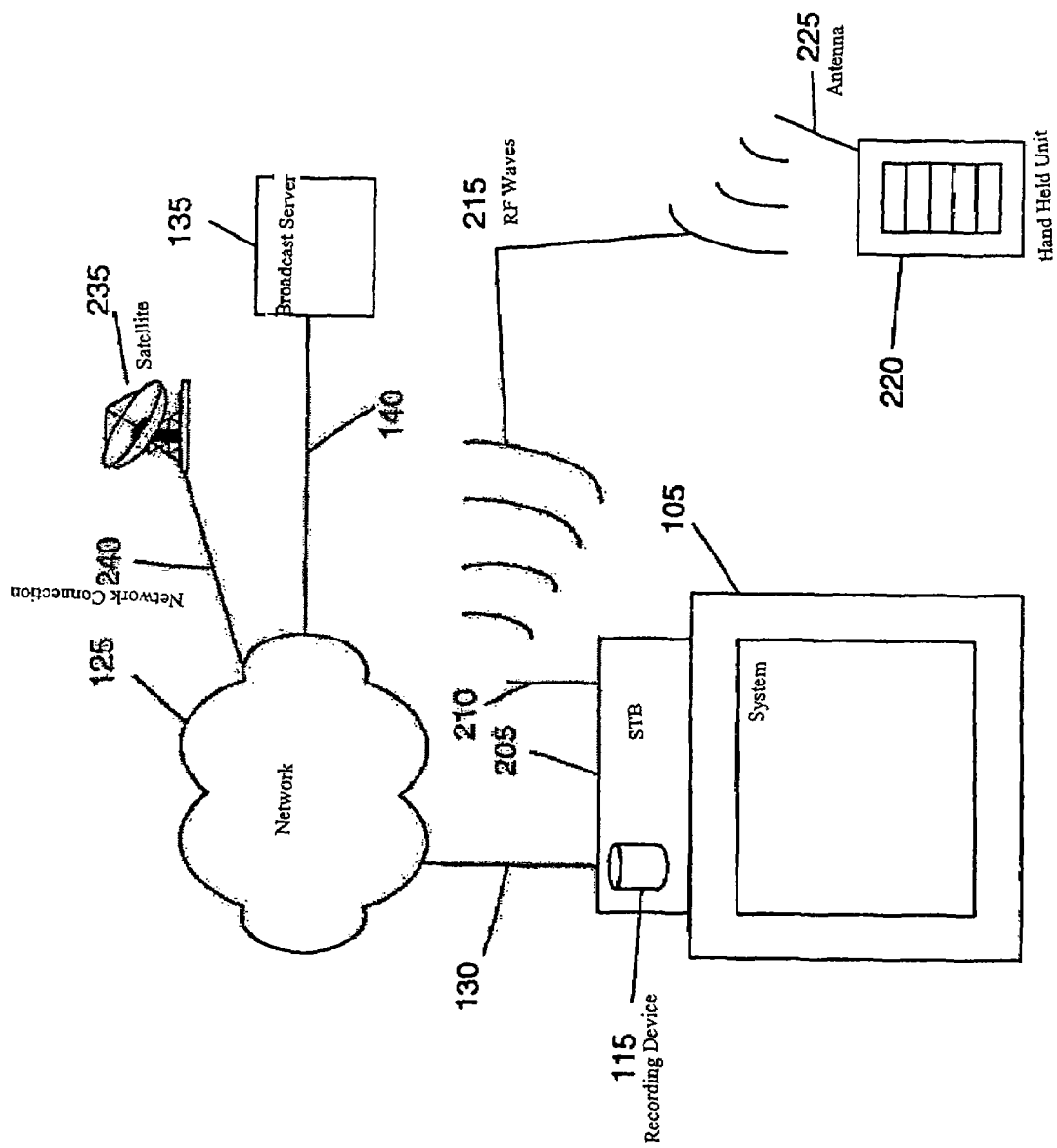
FIG. 2 illustrates an entertainment system with an electronic programming guide displayed on a wireless computing device.

In another embodiment, an EPG could be displayed on a portable computing device. FIG. 2 illustrates an exemplary entertainment system with an EPG displayed on a wireless computing device.

Set top box (STB) 205 has an integrated antenna 210, which transmits RF waves 215. RF waves 215 can be received by hand held unit 220 through antenna 225. Hand held unit 220, could, for example, be a personal digital assistant (PDA). Hand held unit 220 could be equipped with a wireless interface such as Bluetooth™ to communicate with STB 205.

A wireless hand held device, such as hand held unit 220 allows for a great deal of flexibility. A user may move about the room which contains video display 105 and be able to control the functions of the EPG from any point. When using a wireless hand held device to control the EPG, the device may also assume the functions of remote control device 120.

FIG. 2 also shows a satellite receiver 235 connected with network 125 through network connection 240. Satellite receiver 235 can receive satellite signals, in addition to those already transmitted through the network from, e.g., broadcast server 135. Any one of a number of methods of transmitting signals to STB 205 may be employed.

Figure 3:
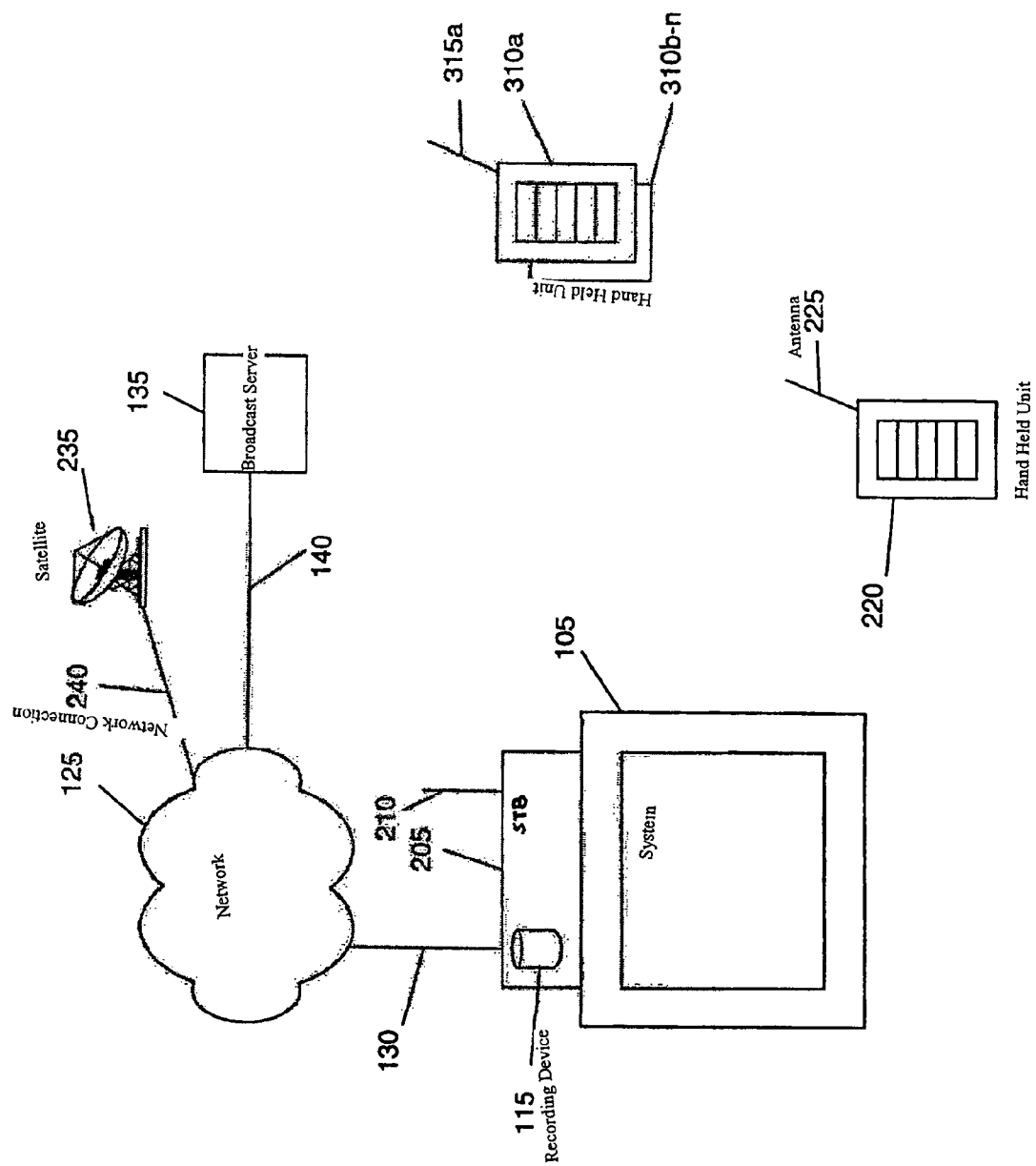
FIG. 3 illustrates an entertainment system coupled with a number of wireless computing devices.

FIG. 3 illustrates an entertainment system coupled with a number of wireless hand-held devices. Similar to hand held unit 220, hand held units 310a-n can display an EPG for entertainment system 100 on their screens. However, handheld units 310a-n are capable of communicating either with STB 205 through antennae 311a-n or with STB 205 through network 125. Hand held devices 310a-n may communicate with network 125 through any number of means, including but not limited to cellular, PCM, satellite, Blue-Tooth™, etc.

A television viewer may often wish to converse with others about which television program to watch. The suggested wireless connection allows all users to view the same EPG. Additionally, the connection may transmit each user's comments or changes to all other users. In one embodiment, because hand held devices 310a-n may connect with STB 205 through network 125, a user may program the EPG when they are away from home, and thus a number of users in a number of locations may view and program the same EPG.

After programming in their selections, and making changes to an EPG, a user's programming selections can be stored on the remote broadcast server 135, and can be downloaded through network 125 to a hand held unit 310a-n. A user can then control the functions of a set top box at a location other than home, such as a friend's house or a hotel. A user may make personalize his EPG, and recording device 115 can even continue to record programs while the user is away from home.

Recordings made by recording device 115 can be sourced out to a spindle farm, a DVD-RAM jukebox or any other massive storage medium. Recordings can be made and organized using the EPG provided to the STB 205. Such methods should be able to store massive amounts of data and a significant amount of video.

Figure 4:
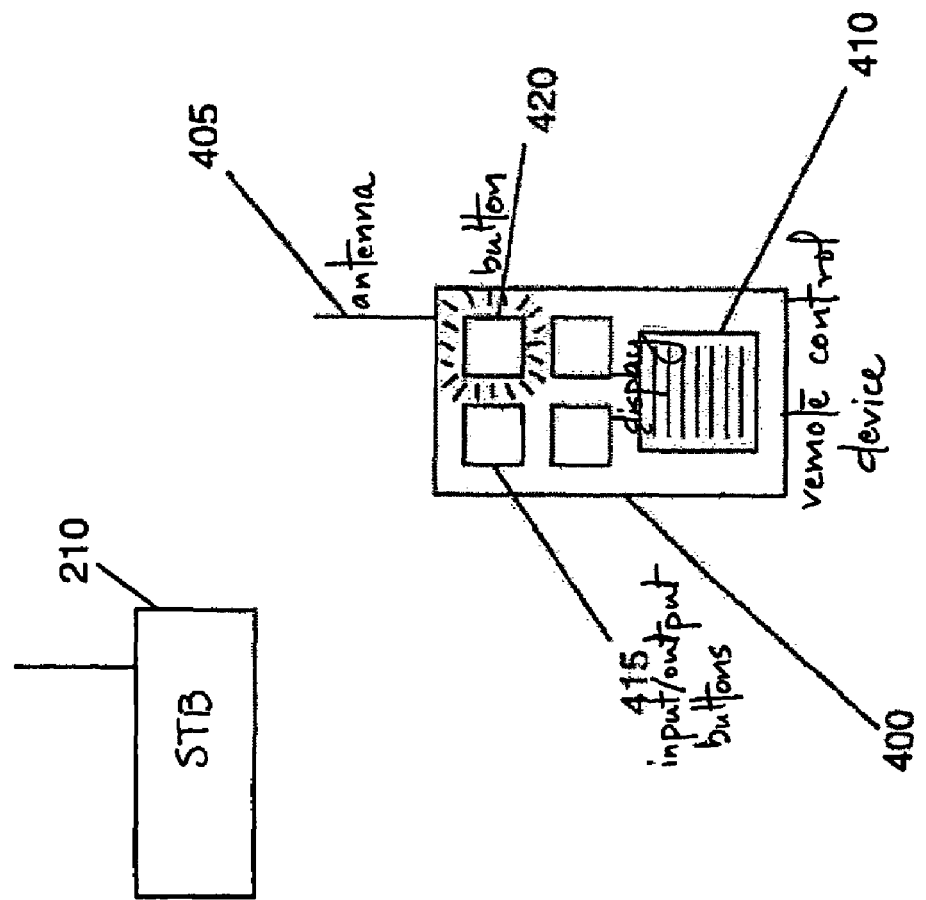
FIG. 4 illustrates a device for indicating that interactive services are available.

FIG. 4 illustrates a method and apparatus for indicating to a user that an interactive service is available. Remote control device 400 comprises antenna 405, display 410, and input-output (I/O) buttons 415.

Remote control device 400 uses antenna 405 to communicate with STB 210. Antenna 405 may be configured to communicate using radio-frequency (RF) waves, infrared waves, Bluetooth™, or any other means of wireless communication.

Display 410 may be used to alert a user of an interactive function. Display 410 may be, for example, a Liquid Crystal Display (LCD) with a colored backlight. When an interactive function begins, the backlight may either flash or change colors to alert the user to the possibility of interactive function. Further, display 410 may display several lines of text to inform the user of the nature of the interactive function. The user may then use buttons 415 to participate in the interactive function.

Additionally, or in lieu of display 410, one or more of buttons 415 may flash or change colors to alert a user of an interactive function. Button 420 is surrounded by a halo to signify that it is lit, and that an interactive function is available. It is also possible to incorporate some sort of audio tone or sound clip through a speaker (not shown) to act as a supplement or as a replacement for the methods described above.

When a provider wants to make an interactive application available, it sends a signal across network 125 to STB 210. STB 210 may then transmit the signal to remote control device 400 through antenna 405. When remote control device 400 receives the signal, it may alert the user as explained above.

Additionally, the alert to the interactive functions may be simultaneously sent to both the video display 105 and the remote control device 400. A user may configure the remote control device 400 such that they may either activate or deactivate the notice displayed on video display 105. Thus, the invention does not lose any of the functionality of previous methods of alerting a user of the possibility of an interactive function.

The system and method described herein may be stored in the memory of a computer system (i.e., a set-top box) as a set of instructions to be executed. In addition, the instructions to perform the system and method described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in the form of a compiled and linked version.

Alternatively, the logic to perform the system and method described herein may be implemented in additional computer and/or machine-readable media such as discrete hardware components as large-scale integrated circuits (LSI's), application specific integrated circuits (ASIC's), firmware such as electrically erasable programmable read-only memory (EEPROM's), and electrical, optical, acoustical, and other forms of propagated signals (e.g., carrier waves, infrared signals, digital signals, etc.).

Although the foregoing description and accompanying figures discuss and illustrate specific embodiments, it should be appreciated that the present invention is to be measured only in terms of the claims that follow.

What is claimed is:

1. A method comprising:
receiving from a control unit at a mobile hand-held device of a plurality of mobile hand-held devices programming information including an electronic programming guide (EPG) via a wireless connection, wherein interactions received at the mobile hand-held device are transmitted to at least one other mobile hand-held device of the plurality of mobile hand-held devices;
receiving, at the mobile hand-held device, a selection of a program from the EPG, wherein the programming information is displayed on a display of the mobile hand-held device;
transmitting the selection of the program to the control unit;
receiving, subsequent to the selection of the program from the EPG, a signal from the control unit indicating a beginning of an interactive application during the selected program; and
in response to the signal, providing a visual indication, through the mobile hand-held device, of an availability of the interactive application,
wherein the mobile hand-held device selectively deactivates visual indications on a display separate from the mobile hand-held device independently of whether visual indications are displayed on the display of the mobile hand-held device.

2. The method of claim 1, wherein providing a visual indication of the availability of the interactive application includes displaying an indicator on the display of the mobile hand-held device.

3. The method of claim 2, wherein providing a visual indication of the availability of the interactive application includes changing one or more background colors of the display of the mobile hand-held device to indicate the availability of the interactive application.

4. The method of claim 2, wherein providing a visual indication of the availability of the interactive application includes flashing at least one button of the mobile hand-held device to indicate the availability of the interactive application.

5. The method of claim 1, wherein the mobile hand-held device is a personal digital assistant.

6. The method of claim 1, wherein the mobile hand-held device is a web phone.

7. The method of claim 1, further comprising providing an additional indication of the availability of the interactive application including a sound generated by the mobile hand-held device.

8. The method of claim 1, wherein providing a visual indication of the availability of the interactive application includes illuminating a section of the mobile hand-held device other than the display of the mobile hand-held device.

9. The method of claim 1, wherein at least one of the interactions received at the mobile hand-held device includes user comments.

10. The method of claim 1, wherein the signal is received after a start of the selected program.

11. The method of claim 1, wherein the interactive application is not available prior to the beginning of the interactive application.

12. A tangible machine readable medium having stored thereon a set of instructions for:
  receiving, at a mobile hand-held device of a plurality of mobile hand-held devices, programming information including an electronic programming guide (EPG) via a wireless connection from a control unit, wherein interactions received at the mobile hand-held device is transmitted to at least one other mobile hand-held device of the plurality of mobile hand-held devices;
  receiving, at the mobile hand-held device, a selection of a program from the EPG, wherein the programming information is displayed on a display of the mobile hand-held device;
  transmitting the selection of the program to the control unit;
  receiving, subsequent to the selection of the program from the EPG, a signal from the control unit indicating a beginning of an interactive application during the selected program; and
  in response to the signal, providing a visual indication, through the mobile hand-held device, of an availability of the interactive application, wherein the mobile hand-held device selectively deactivates visual indications on a display separate from the mobile hand-held device independently of whether visual indications are displayed on the display of the mobile hand-held device.

13. The tangible machine readable medium of claim 12, wherein indicating the availability of the interactive application includes displaying an indicator on the display of the mobile hand-held device.

14. The tangible machine readable medium of claim 13, wherein indicating the availability of the interactive application includes changing one or more background colors of the display of the mobile hand-held device.

15. The tangible machine readable medium of claim 13, wherein indicating the availability of the interactive application includes illumination of at least one button of the mobile hand-held device.

16. The tangible machine readable medium of claim 12, wherein the mobile hand-held device is a personal digital assistant.

17. The tangible machine readable medium of claim 12, wherein the mobile hand-held device is a web phone.

18. The tangible machine readable medium of claim 12, wherein indicating the availability of the interactive application includes generating a sound by the mobile hand-held device to indicate the availability of the interactive application.

19. The tangible machine readable medium of claim 12, wherein indicating the availability of the interactive application includes illuminating a section of the mobile hand-held device other than the display.

20. The tangible machine readable medium of claim 12, wherein indicating the availability of the interactive application is performed during a display of the program on a display separate from the plurality of mobile hand-held devices.

21. The tangible machine readable medium of claim 12, wherein the interactive application is not available prior to the beginning of the interactive application.

22. An apparatus comprising:
  a processor; and
  memory storing computer readable instructions that when executed, cause the apparatus to:
    receive programming information including an electronic programming guide (EPG) via a wireless connection from a control unit, wherein interactions received at the apparatus is transmitted to at least one other apparatus of a plurality of apparatuses associated with the control unit;
    receive a selection of a program from the EPG, wherein the programming information is displayed on a display of the apparatus;
    transmit the selection of the program to the control unit;
    receive, subsequent to the selection of the program from the EPG, a signal from the control unit indicating a beginning of an interactive application during the selected program; and
    in response to the signal, provide a visual indication of an availability of the interactive application, wherein the apparatus selectively deactivates visual indications on a display separate from the apparatus independently of whether visual indications are displayed on the display of the apparatus.

23. The apparatus of claim 22, wherein indicating the availability of the interactive application is performed during a display of the program on a display separate from the plurality of apparatuses.

24. The apparatus of claim 23, wherein whether the visual indication of the availability of the interactive application is provided to the display separate from the plurality of apparatuses devices is configurable through the apparatus.

25. The apparatus of claim 22, wherein the apparatus comprises a mobile hand-held device.

* * * * *